United States Patent [19]

Cognolato et al.

[11] Patent Number: 5,411,565
[45] Date of Patent: * May 2, 1995

[54] FABRICATING STRIP WAVEGUIDES BY CONSOLIDATING A RARE-EARTH-DOPED LAYER WITH A LASER

[75] Inventors: Livio Cognolato, Baldissero Torinese; Angelantonio Gnazzo, Alessandria, both of Italy

[73] Assignees: SIP - Societa Italiana per L-Esbercizio Delle Telecommunicazioni P.A., Turin; Sirti S.p.A., Milan, both of Italy

[*] Notice: The portion of the term of this patent subsequent to Jan. 18, 2011 has been disclaimed.

[21] Appl. No.: 103,750

[22] Filed: Aug. 6, 1993

Related U.S. Application Data

[62] Division of Ser. No. 958,687, Oct. 9, 1992, Pat. No. 5,279,634.

Foreign Application Priority Data

Oct. 15, 1991 [IT] Italy ............... TO91A0775

[51] Int. Cl.⁶ ............................................. C03C 17/02
[52] U.S. Cl. .......................................... 65/386; 65/399; 65/390; 65/392; 65/17.6; 65/60.5
[58] Field of Search ............ 174/3.12, 18.2, 3.11; 176/18.4, 60.5, 60.51, 60.53; 65/386, 399, 392, 390

[56] References Cited

U.S. PATENT DOCUMENTS

| | | | |
|---|---|---|---|
| 3,873,339 | 3/1975 | Hudson | 65/18.2 |
| 5,047,076 | 9/1991 | Cognolato | 65/3.12 |
| 5,080,962 | 1/1992 | Hench | 65/386 |
| 5,196,041 | 3/1993 | Tumminelli | 65/386 |
| 5,279,634 | 1/1994 | Lognolato | 65/18.2 |

*Primary Examiner*—W. Gary Jones
*Assistant Examiner*—John Hoffmann
*Attorney, Agent, or Firm*—Herbert Dubno

[57] ABSTRACT

In order to fabricate strip monomode active optical waveguides for optical telecommunications, a layer of vitreous soot is deposited on a substrate and is impregnated with a solution of a precursor of a rare-earth dopant, and a radiation with a wavelength comprised in an absorption band of the dopant is moved along the soot, along a trajectory corresponding to the geometrical shape desired for the guide, thereby forming a vitrified strip.

4 Claims, 1 Drawing Sheet

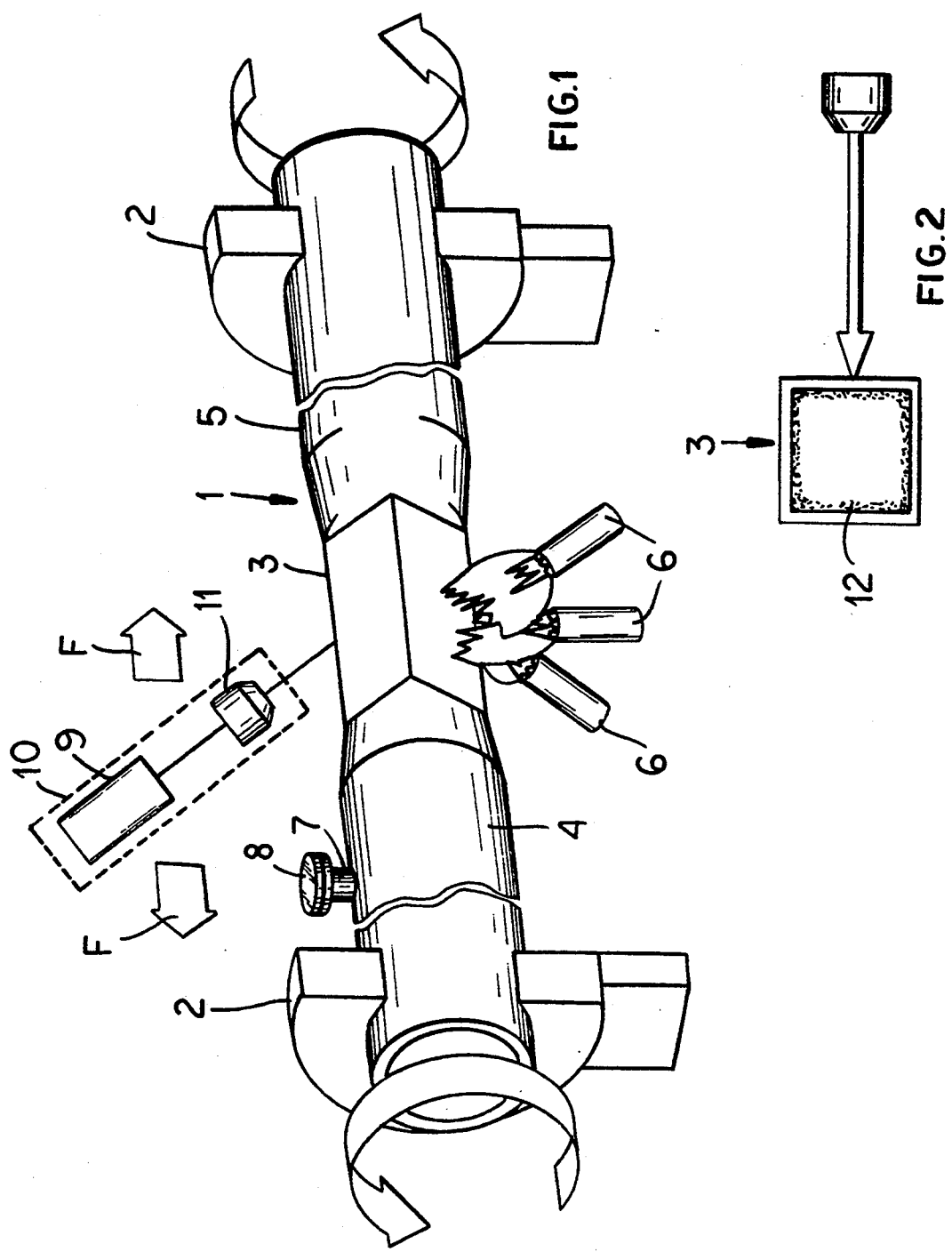

FABRICATING STRIP WAVEGUIDES BY CONSOLIDATING A RARE-EARTH-DOPED LAYER WITH A LASER

This is a divisional of application Ser. No. 07/958,687, filed on Oct. 9, 1992, now U.S. Pat. No. 5,279,634.

The present invention relates to integrated optical components for optical communications and more particularly to a method of fabricating strip active (i.e. capable of amplifying an optical signal) optical waveguides which are monomode in the wavelength range of interest for optical communications.

BACKGROUND OF THE INVENTION

In recent years waveguides of rare-earth doped glass have proved to be particularly attractive for optical communications, since doping gives the guide active characteristics, permitting its use as a coherent source, as an amplifier, etc. Not only active waveguides in fiber form, but also planar or strip waveguides, commonly referred to as "integrated optical waveguides", have been produced. The transmission media most widely used in optical telecommunications systems are monomode fibers and the devices to be interfaced with such media should also be monomode. Monomode integrated active guides are hence of special interest.

The use of ion exchange techniques, commonly utilized to fabricate conventional glass or silica guides, would be desirable also to manufacture strip monomode active guides. These techniques in fact allow fabrication of low attenuation guides, with even complex geometries, in a relatively simple way, are relatively inexpensive and give reproducible results, all of which are important for industrial manufacture. However, in the manufacture of conventional guides, ion exchange concerns monovalent ions, which have high mobility even at relatively low temperatures, whereas manufacture of active guides requires substituting ions in the vitreous matrix with rare earth ions, which are trivalent. A ion exchange of this kind is very difficult to achieve. In fact at the temperatures (300°–500° C.) which are generally used for fabricating conventional optical guides by ion exchange and which are not detrimental to the vitreous matrix of the substrate, rare earth ions have very low mobility, so that the concentrations necessary for active guide fabrication cannot be achieved in reasonable times.

For this reason, the techniques commonly used to fabricate strip active optical guides generally start from a vitreous substrate which is already doped with rare earths and obtain the guiding regions on this substrate by exchange between alkaline ions in the glass and monovalent ions intended to raise the refractive index in the region involved in the exchange (e.g. exchange between Na+ or Li+ glass ions and K+, Ag+ ions) as for a conventional guide. This technique has been described in the paper entitled "Ion-exchanged rare-earth doped waveguides" presented by S. I. Najafi et al. at the International Congress on Glasses for Optoelectronics, Paris, 1989 and published in SPIE Proceedings, Vol. 1128. pages 142 and ff. Yet this method is rather expensive, since it requires doping the whole substrate and not only the guiding regions, and therefore it requires the use of large quantities of rare earth salts, which are expensive per se.

A method of fabricating strip active guides allowing rare-earth ion introduction only in the active regions is described by T. Kitagawa et al. in the article entitled "Guided-wave laser based on herbium-doped silica planar lightwave circuit", Electronics Letters, Vol. 27, No. 4, 14 Feb. 1991. In accordance with this method, a core formed of a $P_2O_5$- $SiO_2$ layer into which herbium ions have been introduced is deposited on a silica substrate by flame hydrolysis deposition. The resulting core is given the geometric structure desired by reactive ion etching techniques and it is covered with a silica overcladding still by a flame deposition technique (FHD). However said techniques produce guides guides with relatively high attenuation.

OBJECT OF THE INVENTION

It is the object of with the present invention to provide a method of manufacturing strip active optical guides is provided, in which the rare-earth ions are introduced only into the guiding regions and relatively low attenuations are achieved.

SUMMARY OF THE INVENTION

The method of the invention is characterised in that according to the inventor a soot layer of the same composition as the substrate on which the guides must be fabricated is deposited on such a substrate, the soot Is impregnated with a solution of at least a rare-earth dopant precursor, a beam of a radiation with a wavelength which is comprised in an absorption band of the rare-earth dopant and to which the substrate is transparent is focused on the soot surface so as to vitrify the doped soot in the area hit by the beam, the beam having a diameter such that the vitrified area has a width corresponding to the width of the guiding region of a monomode guide, and the radiation is made to scan the layer of deposited soot along a trajectory corresponding to the geometrical shape desired for the guide, whereby a vitrified strip is obtained.

Laser vitrification of a material applied to a substrate, for the manufacture of conventional strip optical guides, is described in the paper "Planar and strip waveguides by sol-gel method and laser densification" presented by M. Guglielmi et al. al the European Congress on Optics (ECO4), The Hague, 12–14 Mar. 1991. According to that paper, guiding strips are obtained on a glass plate by depositing thereon a $SiO_2$- $TiO_2$ sol-gel film, with such percentages of the two components that the desired refractive index increase is obtained, and by scanning the surface of such a film with the radiation of a $CO_2$ laser, operating at a wavelength (10.6 $\mu$m) at which glass presents sufficient absorption to cause vitrification. However, taking into account that the width of the vitrified strip is proportional to the wavelength of the radiation used, use of a $CO_2$ laser results in guiding strips 100–200 $\mu$m wide, which dearly are not monomode strips for the near infrared radiation used in optical telecommunications systems. Besides, as is known, such a source entails focusing and control difficulties.

Rare earths present on the contrary absorption bands ranging from the near ultraviolet to the near infrared (from about 300 nm to about 1900 mm according to the element) and hence the impregnated soot can be vitrified by using gas lasers (e.g. He-Cd, At, He-Ne, Kr, $N_2$ lasers) which have sufficient power to cause vitrification (more particularly powers of the order of 1 watt) and emit radiation with the wavelengths, so that guiding strips of much limited width (more particularly of the order of some micrometers), compatible with the requirement of fabricating monomode guides, are easily obtained. Besides, the radiations of such lasers can be focused with the conventional optics used with visible light. It is to be taken into account that, even if one imagines of employing the sol-gel technique described in the paper by M. Guglielmi et al. to apply a film containing a rare-earth salt on the substrate, which film could be vitrified by using radiations with a wavelength compatible with monomode guide manufacture requirements, the sol-gel technique does not allow obtention in the guiding region of material with the desired purity, and hence the resulting guides have high attenuation (today about 1 dB/cm).

Of course the soot must also be doped with materials allowing the refractive index increase with respect to the substrate. A soot already doped with such materials (e.g. $GeO_2$) can be deposited, or a solution containing both rare-earth salts and refractive-index raising substances (e.g. an Al salt) can be used.

Advantageously, the soot doping solution is a solution in a non-aqueous solvent. In this way the presence of hydroxyl groups, which cause attenuation at the wavelengths of interest for telecommunications, is reduced or even eliminated, and also refractive-index raising elements, such as aluminium, whose compounds react violently with water can be used.

The method in accordance with the invention can be implemented by depositing and treating the soot on a substrate consisting of a plate.

Preferably, however, the substrate is a tube with polygonal, more particularly square, cross-section. In this case the soot is deposited on each internal face of the tube, the doped soot is vitrified by Irradiating it from the outside and rotating the tube around its axis to successively expose the various faces to the radiation and, after formation of the vitrified strips on all faces and elimination of excess soot, the different faces are separated.

By the deposition inside a tube it is then possible to fabricate a plurality of guides at the same time. Irradiation from the outside is possible because glass is transparent to the radiations absorbed by rare earths, and hence irradiation does not damage it. Besides, deposition can be carded out by IVPO (Internal Vapor Phase Oxidation) techniques, so that there is no danger of contamination by external agents.

BRIEF DESCRIPTION OF THE DRAWINGS

The above and other objects, features and advantages of the invention will become more readily apparent from the following description, reference being made to the accompanying highly diagrammatic drawing in which:

FIG. 1 is a schematic representation of an apparatus for fabricating strip guides inside a tube; and FIG. 2 is a transverse sectional view of the tube.

SPECIFIC DESCRIPTION

As has been shown in the drawing, a glass tube 1 intended to form the substrate on which the guides are fabricated is mounted so as to rotate around its axis on a conventional glass-making lathe of a chemical vapor deposition apparatus, the lathe being schematically indicated by chucks 2. Tube 1 comprises a central element 3 with polygonal, more particularly square, cross-section, joined with two cylindrical elements 4, 5. The central element has a length basically corresponding to the length of the guides to be obtained, e.g. a few centimeters (5–10 cm). The two cylindrical elements are connected at their free ends to conduits (not shown) for the introduction of the reactants necessary to deposit inside the tube a layer of silica soot, possibly doped with one or more elements intended to raise its refractive index, and for the exhaust of the volatile deposition reaction products. A heat source 6, e.g. a burner, can be moved along square-section element 3 while the tube rotates, to raise the temperature in such a zone up to a value high enough to cause deposition of the soot, but not its vitrification. In one of the two cylindrical elements, e.g. element 4, in proximity of the connection to the square central element, a radial conduit 7 with a suitable sealing system 8 is provided for Introducing a solution of rare-earth dopant precursors (generally a halide or a nitrate of the dopant elements) and possibly of a dopant intended to raise the refractive Index (if the latter dopant is not already present in the deposited soot) and for letting the solution flow out once the doping is completed. For simplicity of the drawing, the sealing systems at the tube ends have been omitted.

A laser source 9 placed in front of central tube element 3 emits a radiation at a wavelength comprised in one of the absorption bands of the rare earths used as dopants and sends such a radiation towards the tube, so as to vitrify the soot by irradiating it from the outside. The source is mounted on a support, schematically represented by block 10, allowing its displacement along the whole length of the central element, as shown by arrow F. Suitable focusing means 11, also mounted on block 10, are associated with the source to form a beam of the diameter required to fabricate a monomode guide and to focus the beam on the internal tube surface.

The method in accordance with the invention of fabricating active optical guides inside a tube 1 is carried out as follows. The case is considered of a silica glass tube, inside which a silica soot layer is deposited. The reactants yielding the soot (e.g. $SiCl_4$ and $O_2$, and possibly $GeCl_4$, if deposition of a soot already doped with the refractive-index raising element is desired) are introduced in a conventional manner into tube 1, whose element 3 is heated by burner 6 up to a temperature of about 1500°–1600° C. A layer 12 is obtained with uniform thickness ranging from some fen to some hundred micrometers (e.g. 50–500 μm). Once the deposition is completed, a solution containing one or more rare-earth salts and possibly a precursor of a refractive-index raising dopant (e.g. an aluminium salt), in case the deposited soot is not yet doped to this aim, is slowly Introduced into tube 1, sealed at its ends, and the soot is allowed to become uniformly Impregnated. Preferably the solution is a non-aqueous solution, and soot doping can be performed by the process described in European Patent Application EP-A-0 372 550, published on 13.06.1990 in the name of SIP. Examples of dopant salts and non-aqueous solvents which can be used are disclosed in that document. The method described in said application permits doping to be performed without removing the tube from the lathe, thus eliminating a cause of contamination. Taking into account that such method is intended for fabrication of optical fibres and not of Integrated optical waveguides, it can be necessary to increase the concentration of rare earth salts with respect to the values given in the specification of that Patent Application, since in case of strip guide fabrication, the length over which the soot and the dopant solution interact is shorter; e.g. the dopant concentration can have values of the order of 0.1 to 1. mol.

After impregnation, the solution is allowed to flow out, e.g. in one of the ways described in the riled Patent Application. This step is followed by dehydration with a gaseous He-$Cl_2$-$O_2$ mixture at a temperature lower than 1000° C., the mixture being introduced and exhausted through the lube ends.

At this point the soot layer on a first face of central element 3 is irradiated with the radiation emitted by source 9, which in a practical embodiment of the process is an Argon laser emitting at a wavelength of 514 nm and having a power of about 1 watt. Such radiation is absorbed by Nd and Er. Such high powers ensure vitrification of the whole thickness of a deposited layer. Source 9 is moved along such a face according to a trajectory corresponding to the geometrical shape wanted for the guiding strip. The tube is transparent to the wavelengths considered, and hence soot vitrification by the laser beam does not damage the substrate. The displacement speed of source 9 depends on layer thickness, on dopant concentration and on beam power. Generally, for the concentrations required by active guides, the above-mentioned thicknesses and a laser with a power of some watts, displacement speed is higher than 1 mm/min and can be of some millimeters/minute, so that vitrification process is fast. At the end of the laser beam stroke, a vitrified strip is obtained on the irradiated face, which strip has a refractive index higher than that of the substrate and a width of some ten micrometers, hence well compatible with guide monomodality requirements. The irradiation with a laser beam is repeated for the other three faces. Irradiation of one face does not damage the opposite face, since the radiation is focused exactly on the surface to be irradiated.

After obtention of the vitrified strips on the four faces, excess soot is removed by rinsing the inside of the tube e.g. with a solution of HF at 0.5%, which damages neither the strips formed nor the substrate. Then the central element is separated from the rest of the tube and the four faces am separated from each other.

As previously stated, the fabrication of the waveguides inside a tube has the advantage that the materials are never exposed to the external environment during the process, so that possible causes of contamination are avoided. However the process conditions described apply also in case of fabrication of guides on an isolated plate. In this case of course more precautions are to be taken to avoid contamination by external elements. Besides, even though guide formation on a silica glass substrate has been described, the process can apply to substrates of different glasses, e.g. oxide glasses, fluoride glasses, and the like.

We claim:

1. A method of fabricating an active strip monomode waveguide of a desired geometrical shape, comprising the steps of:
    (a) depositing upon a substrate for an active strip monomode waveguide, a soot layer of substantially the same composition as that of said substrate;
    (b) impregnating said layer with a solution of at least one rare-earth dopant precursor;
    (c) drying said layer and transforming said precursor into a rare-earth dopant distributed in said layer;
    (d) directing a beam of radiation to which said substrate is transparent and which is of a wavelength in an absorption band of said rare-earth dopant, against said layer thereby heating and fusing said layer to form the active strip monomode waveguide therefrom; and
    (e) during step (d) sweeping said beam against said layer with a trajectory corresponding to said desired geometrical shape.

2. The method defined in claim 1 wherein said radiation has a wavelength comprised in one of the following ranges: a near ultraviolet range, a visible light range and a near infrared range.

3. The method defined in claim 2 wherein said solution also contains a precursor of a refractive-index-raising dopant and, with drying of said layer, said precursor is transformed into said refractive-index-raising dopant.

4. The method defined in claim 2 wherein said solution is a nonaqueous solution.

* * * * *